US012025032B2

(12) United States Patent
Takei et al.

(10) Patent No.: US 12,025,032 B2
(45) Date of Patent: Jul. 2, 2024

(54) STATOR VANE RING AND ROTARY MACHINE

(71) Applicant: MITSUBISHI HEAVY INDUSTRIES, LTD., Tokyo (JP)

(72) Inventors: Sotaro Takei, Tokyo (JP); Yasumasa Hirato, Tokyo (JP); Masayuki Tomii, Tokyo (JP); Hiroyuki Hamana, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/203,821

(22) Filed: May 31, 2023

(65) Prior Publication Data

US 2023/0304411 A1 Sep. 28, 2023

Related U.S. Application Data

(63) Continuation of application No. PCT/JP2022/004493, filed on Feb. 4, 2022.

(30) Foreign Application Priority Data

Feb. 5, 2021 (JP) ................................ 2021-017268

(51) Int. Cl.
*F01D 9/04* (2006.01)

(52) U.S. Cl.
CPC .......... *F01D 9/041* (2013.01); *F05D 2240/12* (2013.01)

(58) Field of Classification Search
CPC ......... F01D 9/04; F01D 9/041; F05D 2240/12
See application file for complete search history.

(56) References Cited

U.S. PATENT DOCUMENTS 8,206,100 B2 * 6/2012 Schuler .................. F01D 25/06 415/189
8,708,641 B2 * 4/2014 Ueda .................... F04D 29/668 415/119

(Continued)

FOREIGN PATENT DOCUMENTS

JP 9-228804 9/1997
JP 2004-124941 4/2004

(Continued)

OTHER PUBLICATIONS

International Search Report issued Apr. 5, 2022 in corresponding International Application No. PCT/JP2022/004493, with English language translation.

(Continued)

*Primary Examiner* — Christopher R Legendre
(74) *Attorney, Agent, or Firm* — Wenderoth, Lind & Ponack, L.L.P.

(57) ABSTRACT

This stationary vane ring comprises a vane group having a plurality of vanes arrayed in the circumferential direction of an axis, a shroud segment in which the radial ends of the plurality of vanes of the vane group are connected to form an arc so as to connect the plurality of vanes in the circumferential direction, and a pressing portion that applies radial pressure to the vane group so that the vane group is pressed against the shroud segment, the pressing portion having pressure distribution such that the pressure at the circumferential center of the shroud segment is less than the pressure at both circumferential ends of the shroud segment.

12 Claims, 10 Drawing Sheets

(56) References Cited

U.S. PATENT DOCUMENTS

| | | | | |
|---|---|---|---|---|
| 2004/0062652 | A1 | 4/2004 | Grant et al. | |
| 2010/0196155 | A1 | 8/2010 | Twell | |
| 2011/0135479 | A1 | 6/2011 | Ueda et al. | |
| 2013/0089417 | A1 | 4/2013 | Wiebe et al. | |
| 2013/0259673 | A1 | 10/2013 | Waki et al. | |
| 2015/0354597 | A1 | 12/2015 | I | |
| 2023/0304411 | A1* | 9/2023 | Takei | F01D 25/246 |

FOREIGN PATENT DOCUMENTS

| | | |
|---|---|---|
| JP | 2010-151044 | 7/2010 |
| JP | 2010-151045 | 7/2010 |
| JP | 2010-151046 | 7/2010 |
| JP | 2014-177888 | 9/2014 |
| JP | 6082285 | 2/2017 |
| WO | 2010/073783 | 7/2010 |
| WO | 2013/146590 | 10/2013 |

OTHER PUBLICATIONS

Written Opinion issued Apr. 5, 2022 in corresponding International Application No. PCT/JP2022/004493, with English language translation.

* cited by examiner

STATOR VANE RING AND ROTARY MACHINE

This application claims priority of Japanese Patent Application No. 2021-017268 filed in Japan on Feb. 5, 2021, the content of which is incorporated herein by reference. This application is a continuation application based on a PCT Patent Application No. PCT/JP2022/004493 whose priority is claimed on Japanese Patent Application No. 2021-017268. The contents of the PCT Application is incorporated herein by reference.

TECHNICAL FIELD

The present disclosure relates to a stator vane ring and a rotary machine.

BACKGROUND ART

PTL 1 discloses a configuration in which an inner peripheral side shroud and an outer peripheral side shroud are divided into a plurality of segments in order to facilitate assembly and disassembly, and in which a stator vane ring is provided on one segment, together with a plurality of vanes arranged in a circumferential direction.

CITATION LIST

Patent Literature

[PTL 1] Japanese Patent No. 6082285

SUMMARY OF INVENTION

Technical Problem

In the stator vane ring described in PTL 1, a restraining force caused by the segment that is applied to an end vane in which one side is free is weaker than a restraining force applied to a central vane in which both sides are restrained by the segment. For this reason, a difference in natural frequency occurs between the vanes. For this reason, a bandwidth of a natural frequency of all the vanes as a whole is widened, and it is difficult to avoid resonance during operation of a rotary machine.

The present disclosure is conceived to solve the above problems, and an object of the present disclosure is to provide a stator vane ring capable of narrowing a bandwidth of a natural frequency, and a rotary machine.

Solution to Problem

In order to solve the above problems, a stator vane ring according to the present disclosure includes: a vane group including a plurality of vanes arranged in a circumferential direction with respect to an axis; a shroud segment that connects radial end portions of the plurality of vanes of the vane group to connect the plurality of vanes in the circumferential direction, and that has an arc shape extending in the circumferential direction; and a pressing unit that applies a pressure to the vane group in a radial direction such that the vane group is pressed against the shroud segment. The pressing unit has a pressure distribution in which the pressure at a center of the shroud segment in the circumferential direction is smaller than the pressure at both ends of the shroud segment in the circumferential direction.

In addition, a rotary machine according to the present disclosure includes the stator vane ring.

Advantageous Effects of Invention

According to the present disclosure, it is possible to provide the stator vane ring capable of narrowing a bandwidth of a natural frequency, and the rotary machine.

DESCRIPTION OF EMBODIMENTS

First Embodiment (Gas Turbine)

Figure 1:
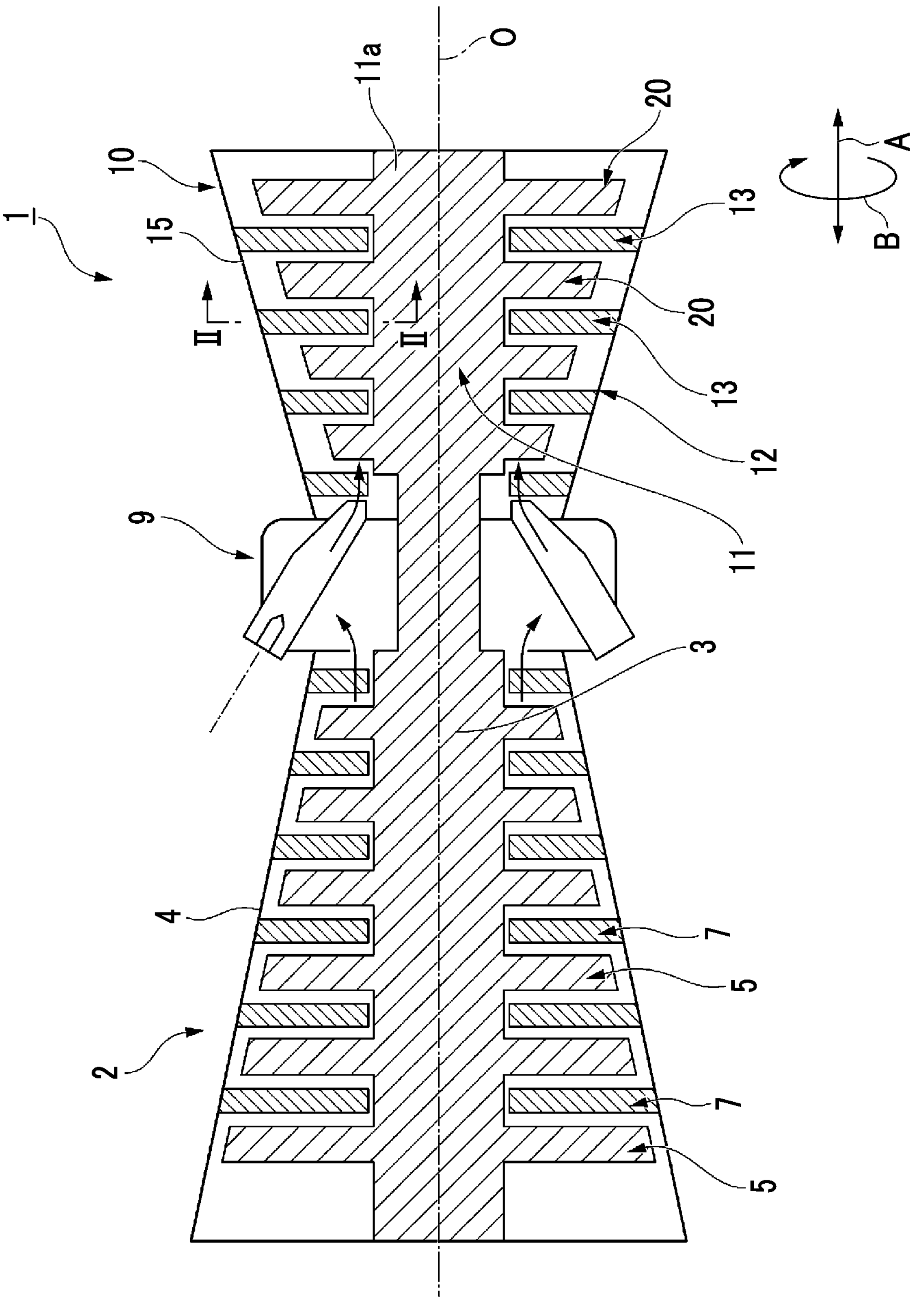
FIG. 1 is a schematic longitudinal cross-sectional view of a gas turbine including a stator vane ring according to an embodiment of the present disclosure.

As shown in FIG. 1, a gas turbine 1 according to the present embodiment includes a compressor 2 that generates compressed air; a combustor 9 that generates combustion gas by mixing fuel with the compressed air and by combusting a mixture thereof; and a turbine 10 that is driven by the combustion gas.

(Compressor)

The compressor 2 includes a compressor rotor 3 that rotates around an axis O, and a compressor casing 4 that covers the compressor rotor 3 from an outer peripheral side. The compressor rotor 3 has a columnar shape extending along the axis O. A plurality of compressor rotor blade rings 5 arranged at intervals in an axial direction A are provided on an outer peripheral surface of the compressor rotor 3. Each of the compressor rotor blade rings 5 includes a plurality of compressor rotor blades arranged on the outer peripheral surface of the compressor rotor 3 at intervals in a circumferential direction B with respect to the axis O. In the present embodiment, the axial direction A means a direction in which the axis O extends.

The compressor casing 4 has a tubular shape centered on the axis O. A plurality of compressor stator vane rings 7 arranged at intervals in the axial direction A are provided on an inner peripheral surface of the compressor casing 4. The compressor stator vane rings 7 are alternately arranged with respect to the compressor rotor blade rings 5 when viewed in the axial direction A. Each of the compressor stator vane rings 7 includes a plurality of compressor stator vanes arranged on the inner peripheral surface of the compressor casing 4 at intervals in the circumferential direction B with respect to the axis O.

(Combustor)

The combustor 9 is provided between the compressor 2 and the turbine 10 continuing to a downstream side (right side in FIG. 1). The compressed air generated by the compressor 2 is mixed with the fuel inside the combustor 9 to become premixed gas. The premixed gas is combusted inside the combustor 9 to generate combustion gas of high temperature and high pressure, and the combustion gas is guided into the turbine 10.

(Turbine)

The turbine 10 includes a rotor 11 that rotates around the axis O, and a stator 12 surrounding the rotor 11.

The rotor 11 includes a rotating shaft **11*a* and a plurality of turbine rotor blade rings 20**.

The rotating shaft **11*a* has a columnar shape extending along the axis O. The rotating shaft 11*a* is integrally connected to the compressor rotor 3** in the axial direction A to form a gas turbine rotor that rotates around the axis O.

The plurality of turbine rotor blade rings 20 are provided on an outer peripheral surface of the rotating shaft **11*a***, and are arranged at intervals in the axial direction A.

Each of the turbine rotor blade rings 20 includes a plurality of turbine rotor blades. The plurality of turbine rotor blades are arranged on the outer peripheral surface of the rotor **11*a*** at intervals in the circumferential direction B with respect to the axis O.

The stator 12 includes a turbine casing 15 and a plurality of stator vane rings 13.

The turbine casing 15 has a tubular shape centered on the axis O.

The plurality of stator vane rings 13 are provided on an inner peripheral side of the turbine casing 15, and are arranged at intervals in the axial direction A. The stator vane rings 13 are alternately arranged with respect to the turbine rotor blade rings 20 when viewed in the axial direction A.

Each of the stator vane rings 13 includes a plurality of vanes **14*a* arranged in the vicinity of an inner peripheral surface of the turbine casing 15** at intervals in the circumferential direction B with respect to the axis O.

Hereinafter, the stator vane ring 13 of a first embodiment will be described with reference to FIGS. 2 and 3A to 3D.

(Stator Vane Ring)

Figure 2:
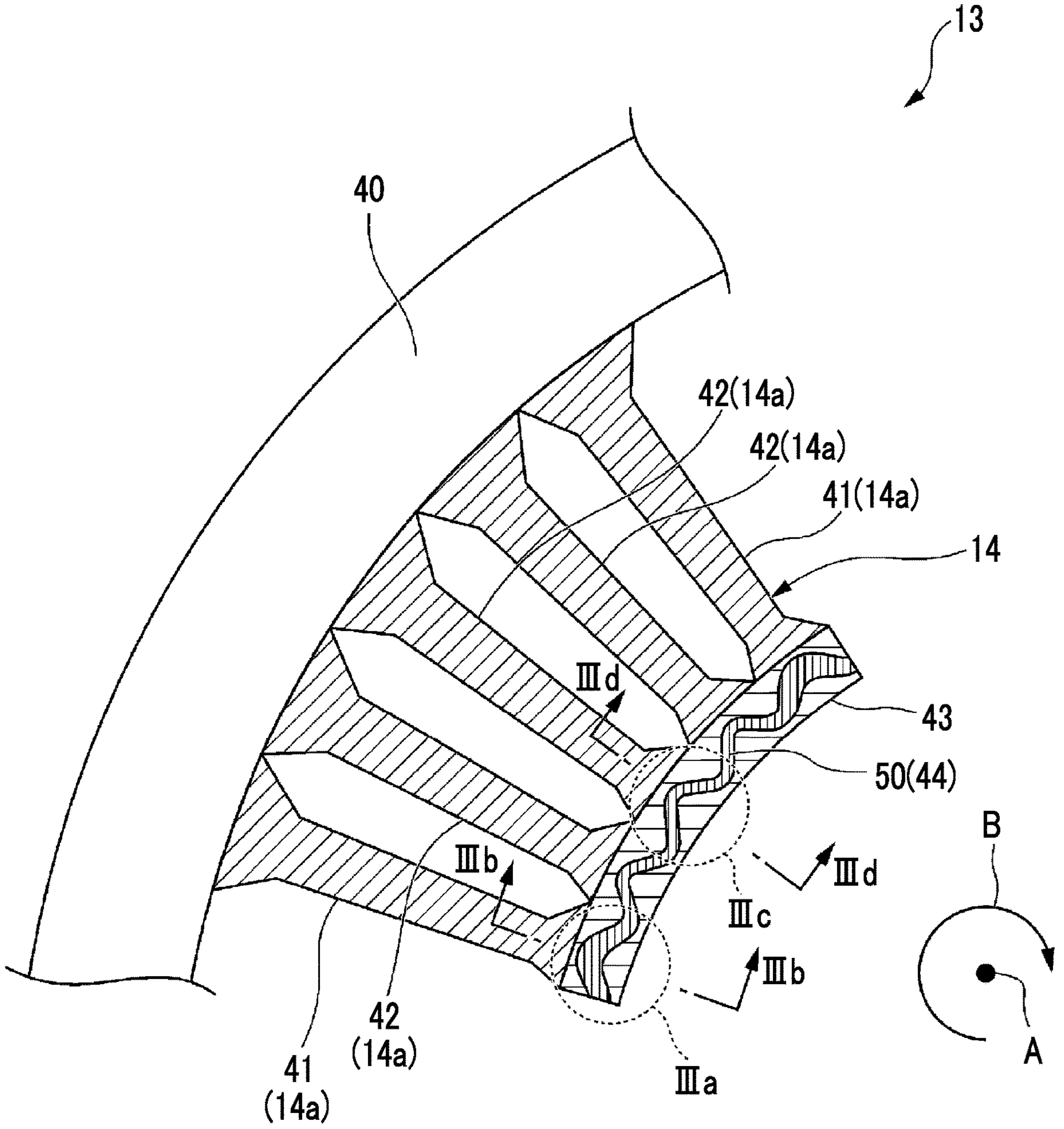
FIG. 2 is a cross-sectional view taken along a direction of line II-II in FIG. 1 according to a first embodiment of the present disclosure.

FIG. 2 is a cross-sectional view of the stator vane ring 13 shown in FIG. 1 taken along a direction of line II-II.

The stator vane ring 13 includes an outer peripheral side shroud 40, a plurality of vane groups 14, a plurality of shroud segments 43, and a pressing unit 44.

The outer peripheral side shroud 40 is a columnar structure having an annular shape centered on the axis O.

Each of the vane groups 14 includes a plurality of the vanes **14*a* arranged in the circumferential direction B with respect to the axis O. Radial outer end portions of the plurality of vanes 14*a* with respect to the axis O are provided on an inner peripheral surface of the outer peripheral side shroud 40 facing a radial inner side, and radial inner end portions thereof are provided on an outer peripheral surface of the shroud segment 43** facing a radial outer side.

In the present embodiment, each of the vane groups 14 includes five vanes **14*a*, two end vanes 41 are provided at both respective ends of the shroud segment 43 in the circumferential direction B, and three central vanes 42 are provided at a center of the shroud segment 43 in the circumferential direction B to be interposed between the two end vanes 41**.

The shroud segment 43 connects the radial inner end portions of the plurality of vanes **14*a* of the vane group 14 to connect the plurality of vanes 14*a* in the circumferential direction B. Therefore, the shroud segments 43 restrict the movement of each of the vanes 14*a*** in the circumferential direction B.

Each of the shroud segments 43 is a structure that is formed in an arc shape centered on the axis O and that extends in the axial direction A, and the plurality of shroud segments 43 are arranged in the circumferential direction B, and end portions of the shroud segments 43 abut against each other, to form an inner peripheral side shroud having an annular shape. For convenience of description of the present embodiment, FIG. 2 shows one shroud segment 43, one vane group 14 provided on the shroud segment 43, and a part of the outer peripheral side shroud 40.

The pressing unit 44 is a leaf spring 50 provided to extend in the circumferential direction B between the vane group 14 and the shroud segment 43.

Figure 3A:
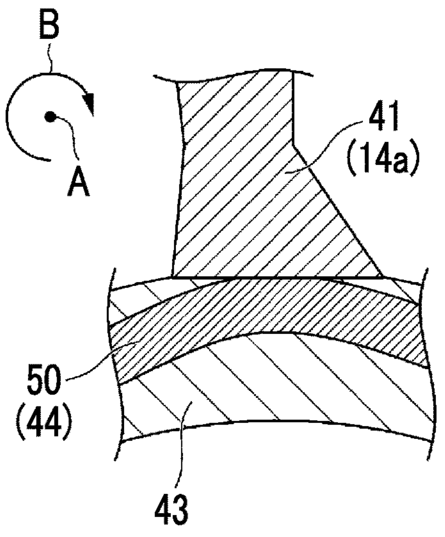
FIGS. 3A and 3C are enlarged views of a portion IIIa and of a portion IIIc in FIG. 2, and FIGS. 3B and 3D are cross-sectional views taken along a direction of line IIIb-IIIb and along a direction of line IIId-IIId, respectively.
Figure 3B:
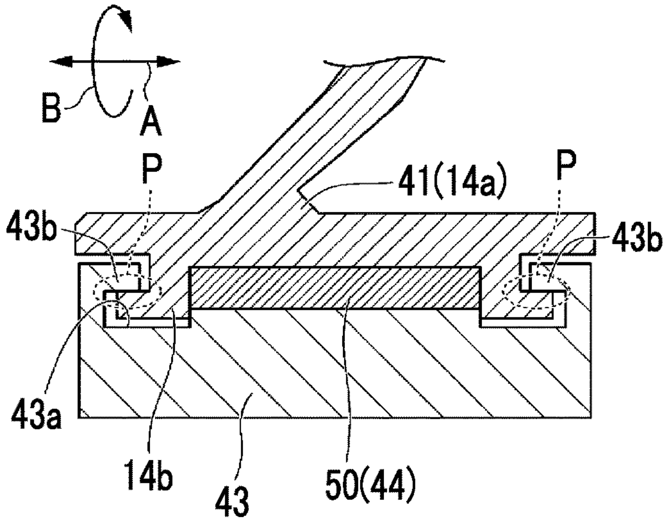
Figure 3C:
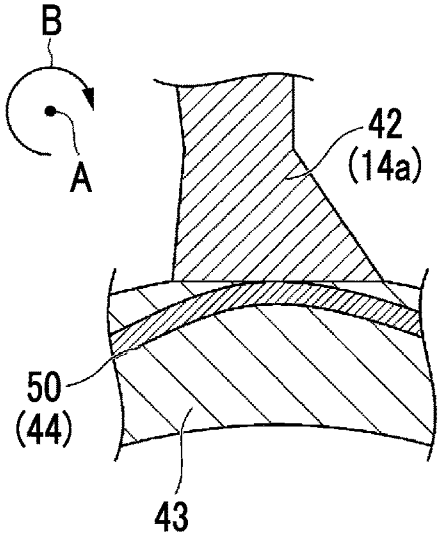

FIG. 3A is an enlarged view of a portion IIIa of the end vane 41 shown in FIG. 2, and FIG. 3B is a cross-sectional view of the end vane 41 shown in FIG. 2 taken along a direction of line IIIb-IIIb. In addition, FIG. 3C is an enlarged view of a portion IIIc of the central vane 42 shown in FIG. 2, and FIG. 3D is a cross-sectional view of the central vane 42 shown in FIG. 2 taken along a direction of line IIId-IIId.

Figure 3D:
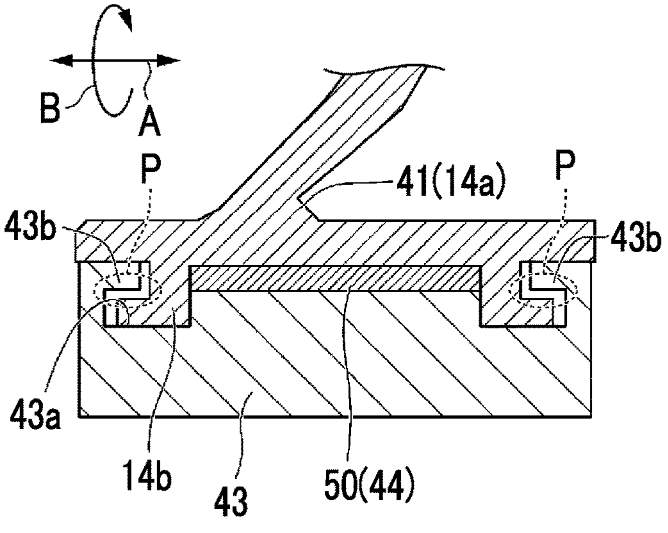

As shown in FIGS. 3B and 3D, the shroud segment 43 includes a recessed portion **43*a* in the outer peripheral surface facing the radial outer side with respect to the axis O, the recessed portion 43*a* being capable of accommodating the radial inner end portion of the vane 14*a*. The recessed portion 43*a* includes an engaging portion 43*b* extending from an inner peripheral surface of the recessed portion 43*a* in the axial direction A. In addition, the radial inner end portion of each of the vanes 14*a* includes a flange portion 14*b* extending in the axial direction A. Accordingly, the flange portion 14*b* and the engaging portion 43*b* engage with each other inside the recessed portion 43*a***.

The leaf spring 50 comes into contact with an inner peripheral surface of the vane **14*a* facing the radial inner side, to apply an elastic pressure (biasing force) toward the radial outer side to the vane 14*a*. Accordingly, a pressure to restrain the vane 14*a* on the shroud segment 43 is generated in a pressure generation region P defined by the engagement between the flange portion 14*b* and the engaging portion 43*b*. Accordingly, the vane 14*a* is restrained from moving in a radial direction with respect to the shroud segment 43**.

Therefore, the leaf spring 50 serving as the pressing unit 44 applies a pressure toward the radial outer side to the vane group 14, thereby pressing the vane group 14 against the shroud segment 43 using the pressure generation region P.

A plate thickness of the leaf spring 50 corresponding to each of the central vanes 42 provided on a central side of the shroud segment 43 in the circumferential direction B is set to be thinner than a plate thickness of the leaf spring 50 corresponding to the end vanes 41 provided at both the respective ends of the shroud segment 43 in the circumferential direction B. Therefore, a pressure generated in the pressure generation regions P of the end vanes 41 to be applied in the radial direction is relatively strong, and a pressure generated in the pressure generation regions P of the central vanes 42 to be applied in the radial direction is relatively weak. Namely, the leaf spring 50 serving as the pressing unit 44 has a pressure distribution in which a pressure at the center of the shroud segment 43 in the circumferential direction B is smaller than a pressure at both the ends of the shroud segment 43 in the circumferential direction B.

(Actions and Effects)

In the stator vane ring 13 according to the first embodiment, the leaf spring 50 serving as the pressing unit 44 applies a pressure toward the radial outer side to the vane group 14 such that the vane group 14 is pressed against the shroud segment 43 through the pressure generation regions P. Further, the pressure applied in the radial direction in the pressure generation regions P is relatively strong on the end vanes 41, and is relatively weak on the central vanes 42.

Accordingly, a natural frequency of the end vanes 41 subjected to a relatively weak restraining force caused by the shroud segment 43 can be increased, and a natural frequency of the central vanes 42 subjected to a relatively strong restraining force can be reduced. Therefore, since the natural frequencies of the vanes 14*a* are close to each other, a bandwidth of a natural frequency of the stator vane ring 13 as a whole can be narrowed. Accordingly, it is easy to avoid intersection between an excitation harmonic corresponding to a rotation speed of the gas turbine 1 in operation and the bandwidth of the natural frequency of the stator vane ring 13 as a whole. As a result, the occurrence of resonance in the stator vane ring 13 as a whole can be suppressed.

Second Embodiment

Figure 4:
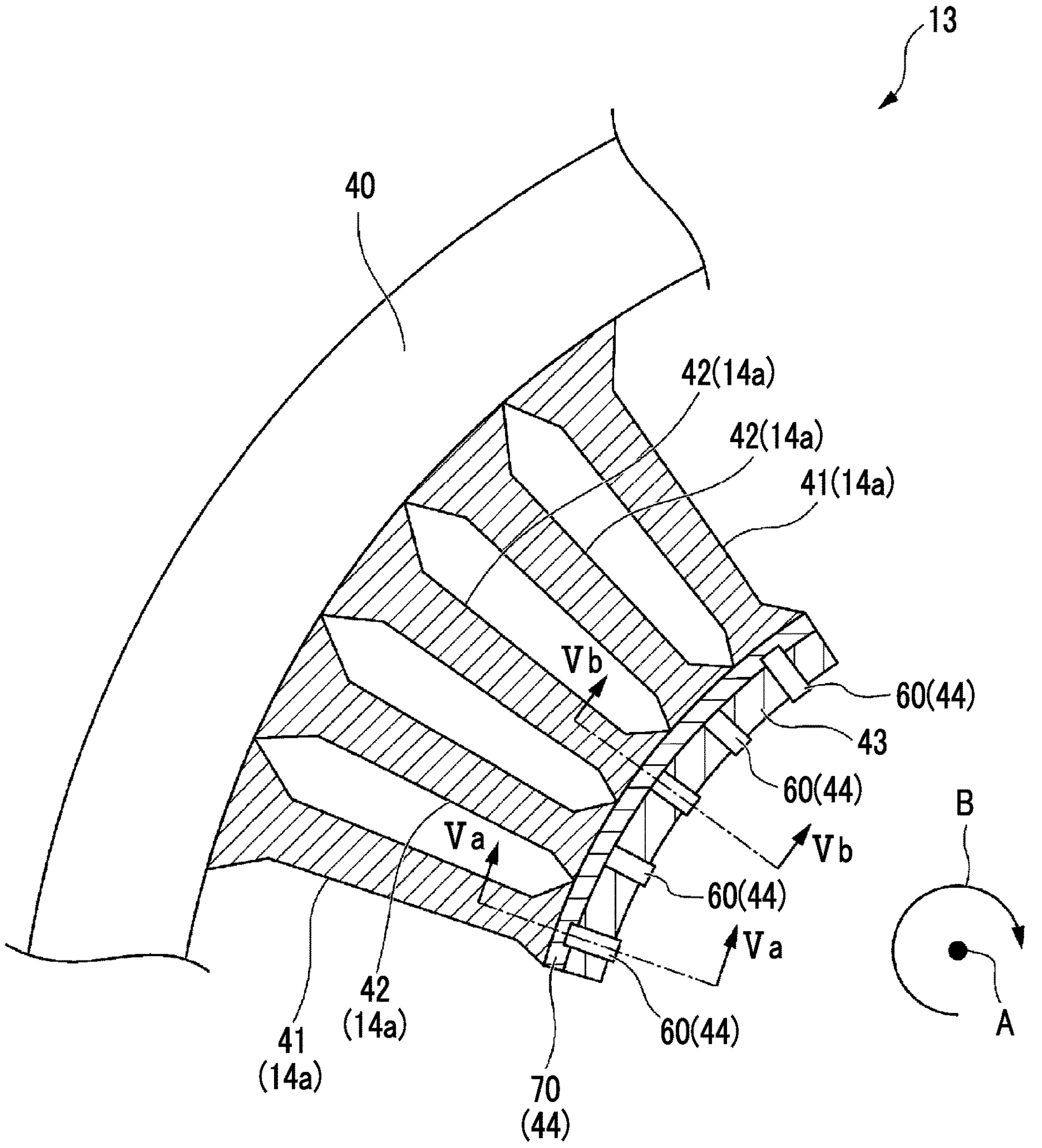
FIG. 4 is a cross-sectional view taken along the direction of line II-II in FIG. 1 according to a second embodiment of the present disclosure.

Hereinafter, a configuration of the stator vane ring 13 of a second embodiment of the present disclosure will be described with reference to FIGS. 4, 5A, and 5B. The second embodiment has the same configuration as that of the first embodiment except for a configuration of the pressing unit 44 included in the stator vane ring 13. The same components as those in the first embodiment are denoted by the same reference signs, and detailed descriptions thereof will not be repeated. FIG. 4 is a cross-sectional view taken along the direction of line II-II shown in FIG. 1.

(Stator Vane Ring)

The pressing unit 44 includes a pressing plate 70 and a plurality of bolts 60.

The pressing plate 70 is provided to extend in the circumferential direction B between the vane group 14 and the shroud segment 43.

The plurality of bolts 60 are provided inside the shroud segment 43 located on the radial inner side with respect to the pressing plate 70, to correspond to the respective vanes 14*a*.

Figure 5A:
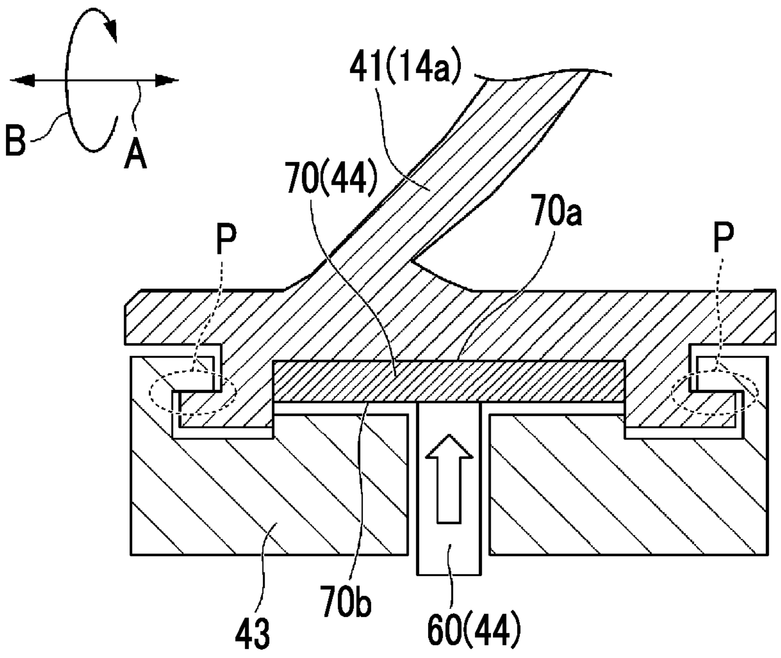
FIGS. 5A and 5B are cross-sectional views taken along a direction of line Va-Va and along a direction of line Vb-Vb in FIG. 4, respectively.
Figure 5B:
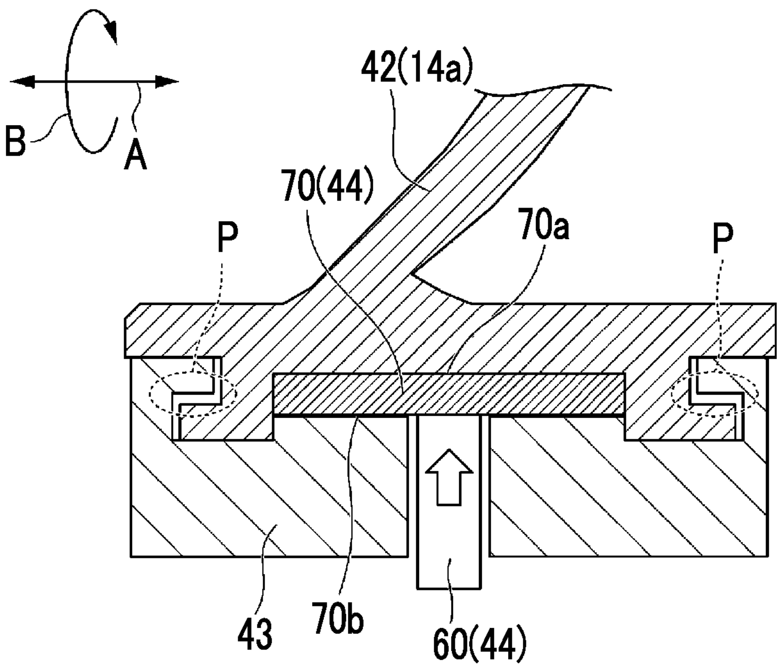

FIG. 5A is a cross-sectional view of the end vane 41 shown in FIG. 4 taken along a direction of line Va-Va, and FIG. 5B is a cross-sectional view of the central vane 42 shown in FIG. 4 taken along a direction of line Vb-Vb.

As shown in FIGS. 4, 5A, and 5B, one surface 70*a* of the pressing plate 70 facing the radial outer side abuts against the inner peripheral surface of the vane 14*a* facing the radial inner side, and the other surface 70*b* of the pressing plate 70 facing the radial inner side is in contact with a radial outer end portion of the bolt 60.

Each of the plurality of bolts 60 presses the pressing plate 70 toward the radial outer side, thereby applying a pressure to the vane group 14 through the pressing plate 70. Accordingly, a pressure to restrain the vanes 14*a* on the shroud segment 43 is generated in the pressure generation regions P, and the vanes 14*a* are restrained from moving in the radial direction with respect to the shroud segment 43.

In addition, a tightening torque of the bolts 60 coming into contact with the pressing plate 70 on the central vanes 42 is smaller than a tightening torque of the bolts 60 coming into contact with the pressing plate 70 on the end vanes 41. Therefore, a pressure generated in the pressure generation regions P of the end vanes 41 to be applied in the radial direction is relatively strong, and a pressure generated in the pressure generation regions P of the central vanes 42 to be applied in the radial direction is relatively weak. Namely, the pressing unit 44 has a pressure distribution in which a pressing force to press the vanes 14*a* at the center in the circumferential direction B is smaller than a pressing force to press the vanes 14*a* at both the ends in the circumferential direction B.

(Actions and Effects)

In the stator vane ring 13 according to the second embodiment, the pressing plate 70 and the plurality of bolts 60 that serve as the pressing unit 44 apply a pressure toward the radial outer side to the vane group 14, and the pressure applied in the radial direction in the pressure generation region P of each of the vanes 14*a* is relatively strong on the end vanes 41, and is relatively weak on the central vanes 42.

Accordingly, the same actions and effects as those of the configuration of the first embodiment can be obtained. Further, the above actions and effects can be realized by a configuration using simple and inexpensive materials such as the bolts 60 and the pressing plate 70.

Third Embodiment

Figure 6:
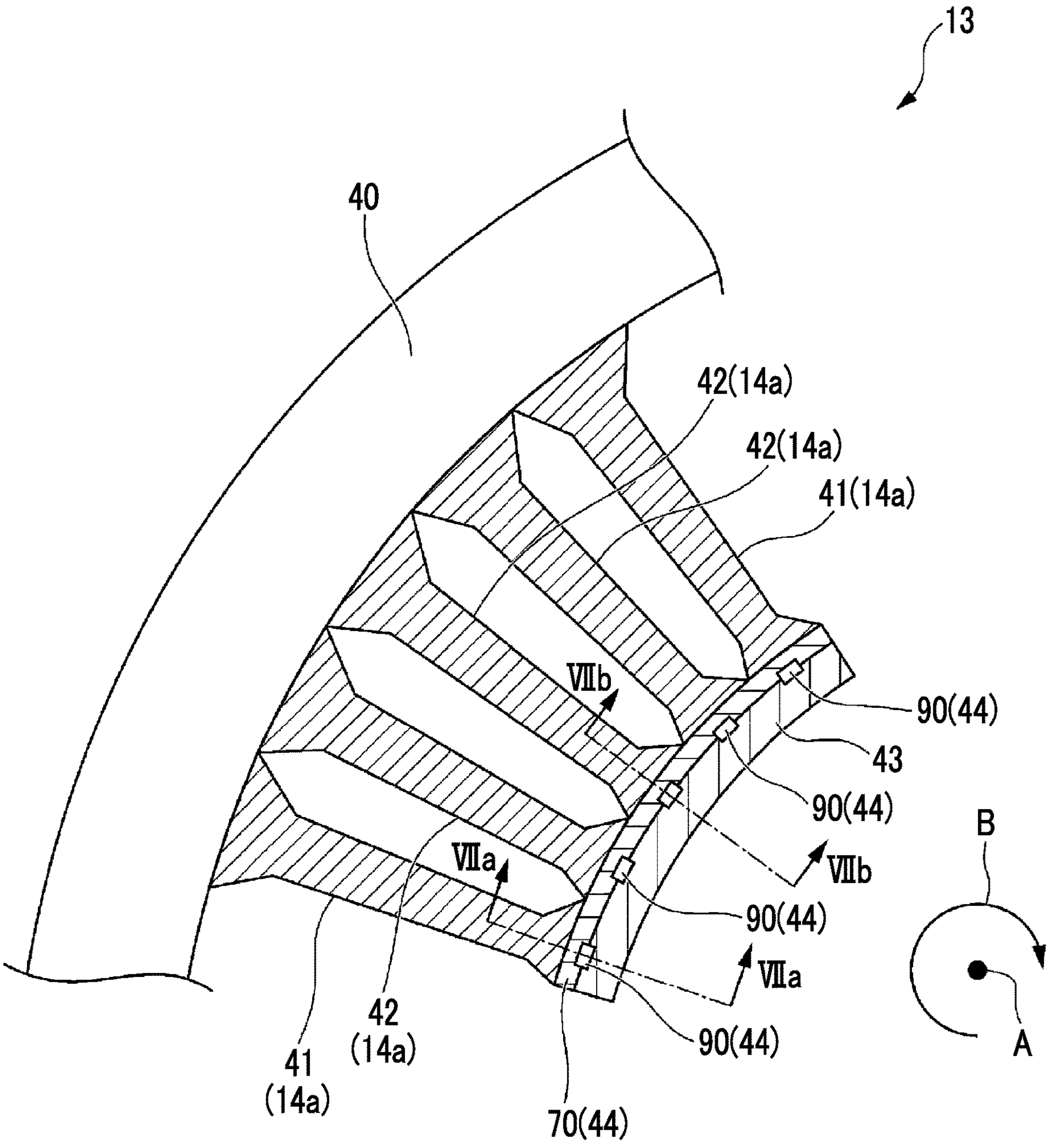
FIG. 6 is a cross-sectional view taken along the direction of line II-II in FIG. 1 according to a third embodiment of the present disclosure.

Hereinafter, a configuration of the stator vane ring 13 of a third embodiment of the present disclosure will be described with reference to FIGS. 6, 7A, and 7B. The third embodiment has the same configuration as that of the first embodiment except for a configuration of the pressing unit 44 included in the stator vane ring 13. The same components as those in the first embodiment are denoted by the same reference signs, and detailed descriptions thereof will not be repeated. FIG. 6 is a cross-sectional view taken along the direction of line II-II shown in FIG. 1.

(Stator Vane Ring)

The pressing unit 44 includes the pressing plate 70 and a plurality of actuators 90.

The pressing plate 70 is provided to extend in the circumferential direction B between the vane group 14 and the shroud segment 43.

The plurality of actuators 90 are provided between the pressing plate 70 and the shroud segment 43 to correspond to the respective vanes 14*a*.

Figure 7A:
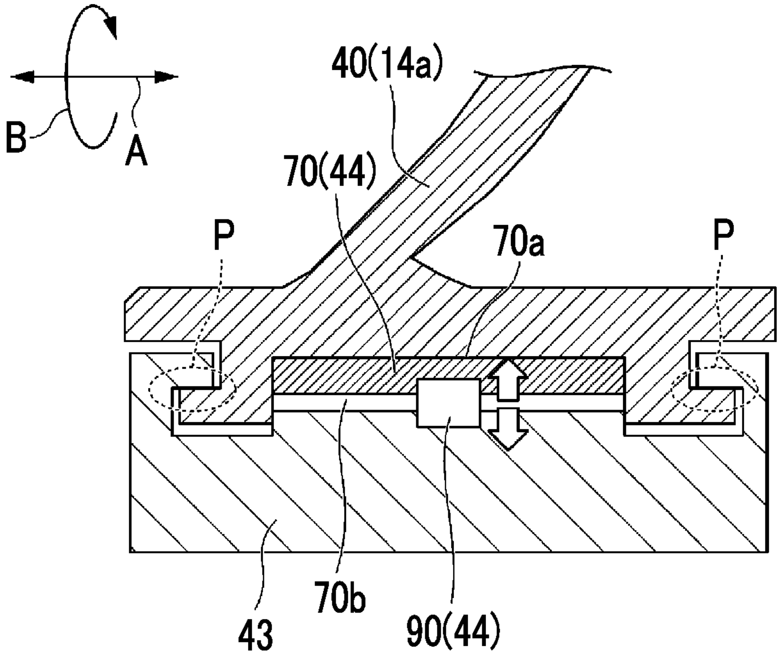
FIGS. 7A and 7B are cross-sectional views taken along a direction of line VIIa-VIIa and along a direction of line VIIb-VIIb in FIG. 6, respectively.
Figure 7B:
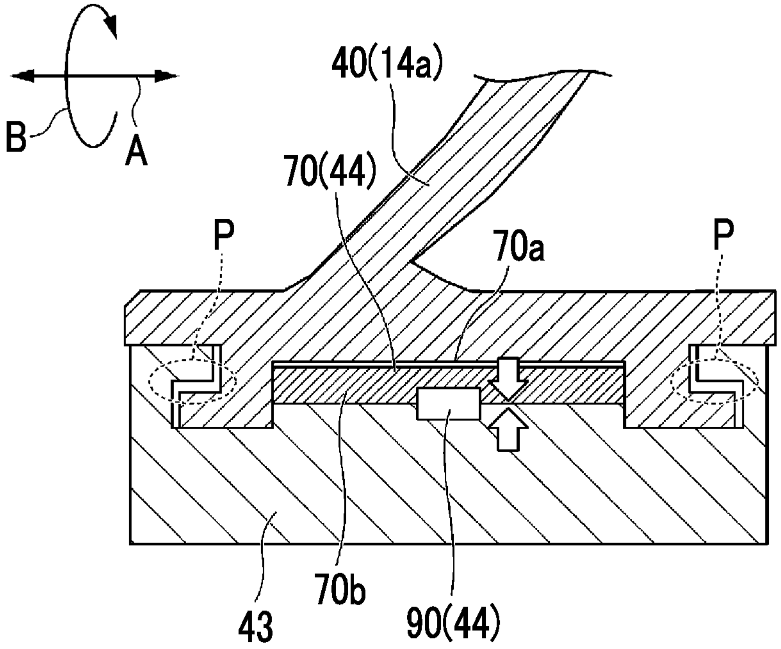

FIG. 7A is a cross-sectional view of the end vane 41 shown in FIG. 6 taken along a direction of line VIIa-VIIa, and FIG. 7B is a cross-sectional view of the central vane 42 shown in FIG. 6 taken along a direction of line VIIb-VIIb.

The plurality of actuators 90 are electrically connected to a power source (not shown) outside the stator vane ring 13 by respective cables (not shown). The actuator 90 is a mechanical element that converts an electric signal input from the power source, into a physical motion, and when an electric signal is input, the actuator 90 expands and contracts in the radial direction by a predetermined length corresponding to a magnitude of a voltage of the electric signal. The magnitude of the voltage of the electric signal to be output from the power source is suitably controlled from the outside of the gas turbine 1 by a computer (not shown). Namely, an expansion and contraction amount of the actuators 90 corresponding to the respective vanes 14*a* is suitably controlled by the computer. For example, a piezoelectric element is used as the actuator 90.

The plurality of actuators 90 expand and contract toward the radial outer side, and press the pressing plate 70 to apply a pressure to the vane group 14 through the pressing plate 70. Accordingly, a pressure to restrain the vanes 14*a* on the shroud segment 43 is generated in the pressure generation regions P, and the vanes 14*a* are restrained from moving in the radial direction with respect to the shroud segment 43.

In addition, an expansion and contraction amount in the radial direction of the actuators 90 coming into contact with the pressing plate 70 on the central vanes 42 is smaller than an expansion and contraction amount in the radial direction of the actuators 90 coming into contact with the pressing plate 70 on the end vanes 41. Therefore, a pressing force of the actuators 90 generated in the pressure generation regions P of the end vanes 41 to be applied in the radial direction is relatively strong, and a pressing force of the actuators 90 generated in the pressure generation regions P of the central vanes 42 to be applied in the radial direction is relatively weak. Accordingly, the pressing unit 44 has a pressure distribution in which a pressing force to press the vanes 14*a* at the center in the circumferential direction B is smaller than a pressing force to press the vanes 14*a* at both the ends in the circumferential direction B.

(Actions and Effects)

In the stator vane ring 13 according to the third embodiment, the actuators 90 serving as the pressing unit 44 apply a pressure toward the radial outer side to the vane group 14, and the pressure applied in the radial direction in the pressure generation region P of each of the vanes 14*a* is relatively strong on the end vanes 41, and is relatively weak on the central vanes 42. Accordingly, the same actions and effects as those of the configuration of the first embodiment can be obtained.

In addition, according to the above configuration, a voltage of an electric signal to be input to the actuators 90 can be controlled by the computer. Accordingly, the expansion and contraction amount of the actuators 90 can be controlled from the outside even during operation of the gas turbine 1, and suitable active control according to situations can be realized, so that the above actions and effects can be enhanced.

OTHER EMBODIMENTS

Hereinafter, the embodiments of the present disclosure have been described in detail with reference to the drawings, but the specific configurations are not limited to the configurations of each embodiment, and configurations can be added, omitted, replaced, and changed without departing from the concept of the present disclosure. In addition, the present disclosure is not limited by the embodiments, but is limited only by the claims.

Figure 8:
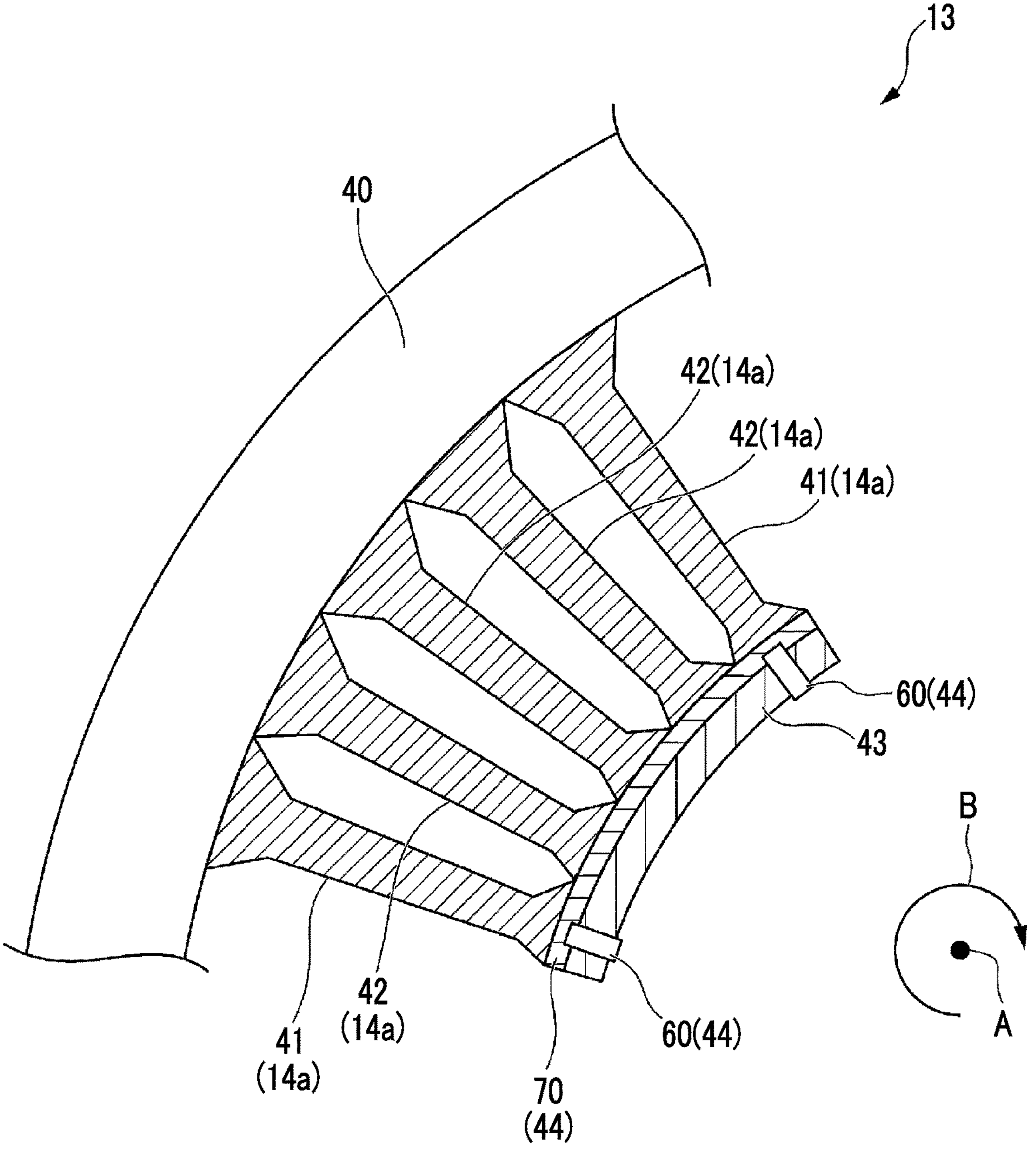
FIG. 8 is a cross-sectional view taken along the direction of line II-II in FIG. 1 according to a first modification example of the second embodiment of the present disclosure.

A first modification example of the second embodiment is shown in FIG. 8. As shown in FIG. 8, the bolts 60 of the pressing unit 44 may be provided inside the shroud segment 43 to correspond only to the respective end vanes 41, and may not be provided for the central vanes 42. Namely, the pressing unit 44 presses only the vanes 14*a* at both the ends in the circumferential direction B to apply a pressure toward the radial outer side to the vane group 14.

Accordingly, the pressure applied in the radial direction in the pressure generation region P of each of the vanes 14*a* is relatively strong on the end vanes 41, and is relatively weak on the central vanes 42, so that the same actions and effects as those of the second embodiment can be obtained. In addition, since locations where the bolts 60 are provided are limited only to both the ends in the circumferential direction B, processing in manufacturing is facilitated.

In addition, a plurality of the bolts 60 may be provided to correspond only to the end vanes 41.

Figure 9:
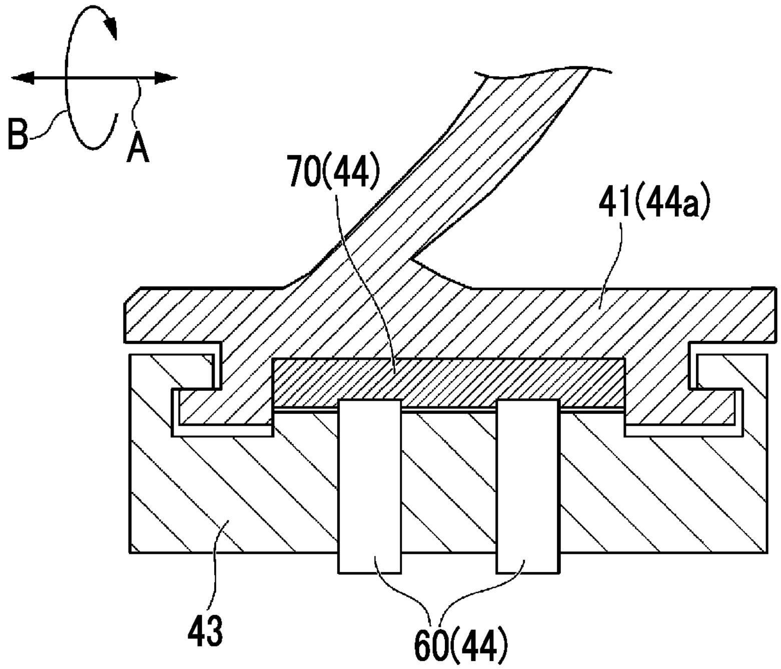
FIG. 9 is a cross-sectional view taken along the direction of line Va-Va in FIG. 4 according to a second modification example of the second embodiment of the present disclosure.

In addition, a second modification example of the second embodiment is shown in FIG. 9. As shown in FIG. 9, a plurality of two or more bolts 60 of the pressing unit 44 are provided inside the shroud segment 43 to correspond to the end vane 41, and the number of the bolts 60 that press the central vane 42 may be smaller than the number of the bolts 60 that press the end vane 41.

Accordingly, the pressure applied in the radial direction in the pressure generation region P of each of the vanes 14*a* is relatively strong on the end vanes 41, and is relatively weak on the central vanes 42, so that the same actions and effects as those of the second embodiment can be obtained.

Figure 10:
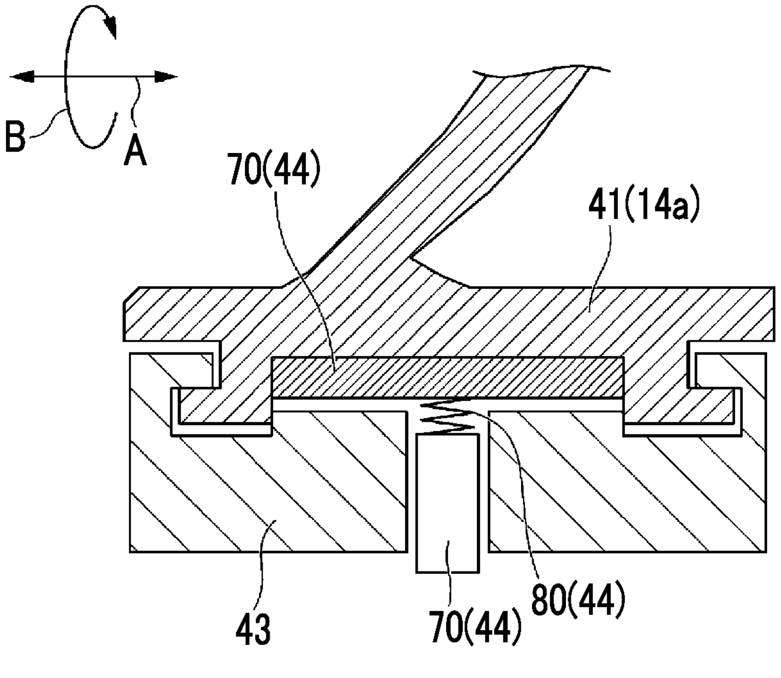
FIG. 10 is a cross-sectional view taken along the direction of line Va-Va in FIG. 4 according to a third modification example of the second embodiment of the present disclosure.

In addition, a third modification example of the second embodiment is shown in FIG. 10. As shown in FIG. 10, the pressing unit 44 may further include a pressing spring 80 between the pressing plate 70 and the bolt 60.

Accordingly, a pressing force of the bolt 60 that is converted into an elastic pressure (biasing force) can be applied to the vane 14*a*. Therefore, when any abnormal vibration suddenly occurs in the stator 12 during operation of the gas turbine 1, no impact force from the pressing unit 44 of the shroud segment 43 is applied to the vane 14*a*. Accordingly, an appropriate pressure can be generated in the pressure generation region P, and reliability of the stator vane ring 13 can be enhanced.

In addition, the configurations of the pressing units 44 provided in the above embodiments are not limited to independent configurations, and may be appropriately combined to form the pressing unit 44 of the stator vane ring 13.

In addition, the pressing unit 44 included in the stator vane ring 13 of the above embodiments is disposed on a shroud segment 43 side, but the pressing unit 44 may be disposed on an outer peripheral side shroud 40 side. In this case, the pressing unit 44 applies a pressure toward the radial inner side to the vane group 14, and even in this case, the same actions and effects as those of the pressing unit 44 provided on the shroud segment 43 side are achieved.

In addition, the pressing units 44 may be disposed on both the outer peripheral side shroud 40 side and the shroud segment 43 side. Accordingly, the above actions and effects can be further enhanced.

Figure 11:
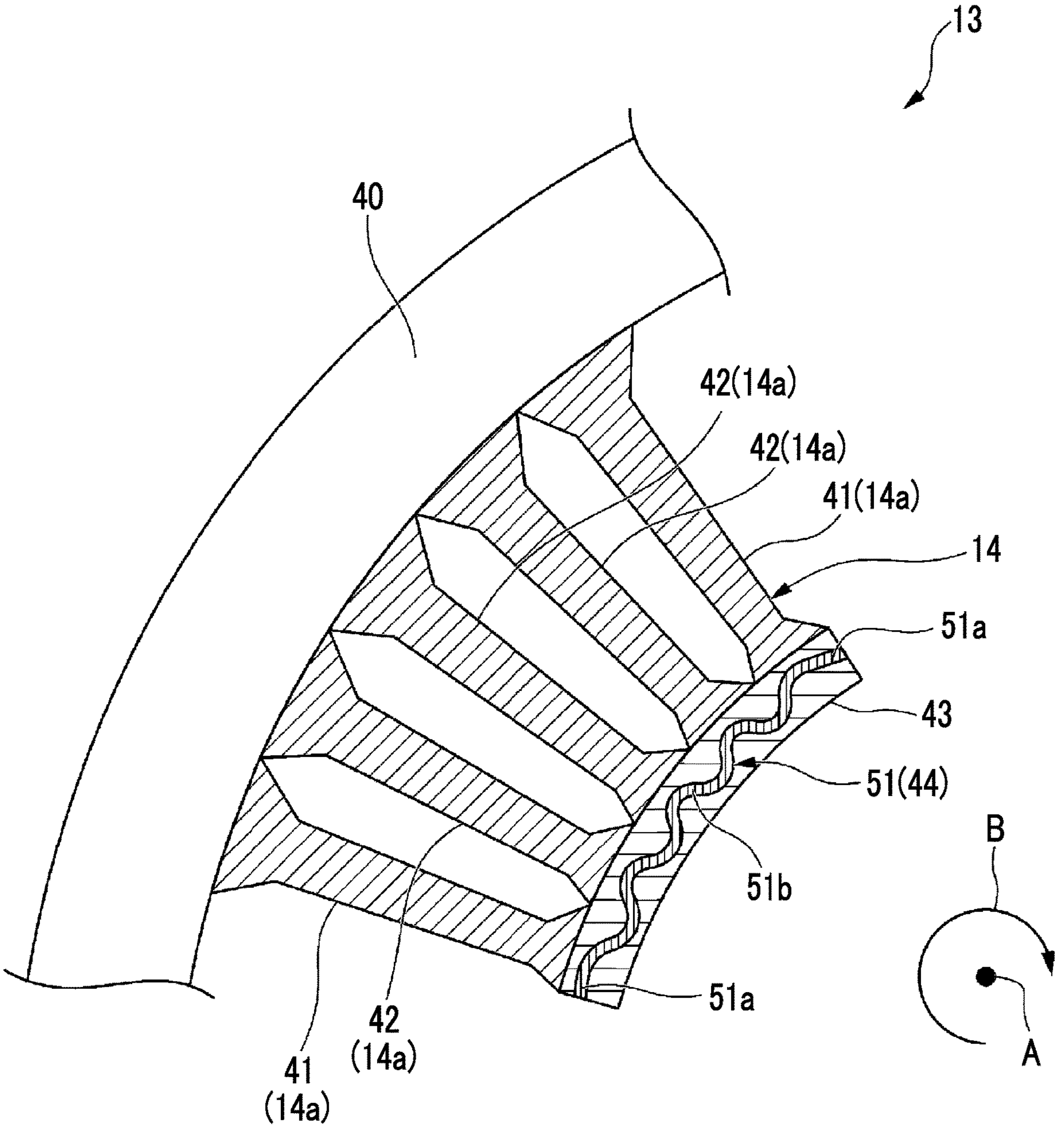
FIG. 11 is a view describing a configuration of a pressing unit according to another embodiment of the present disclosure.

In addition, the pressing unit 44 is not limited to the configuration of the leaf spring 50 described in the first embodiment. For example, as shown in FIG. 11, the pressing unit 44 is a leaf spring 51 provided to extend in the circumferential direction B between the vane group 14 and the shroud segment 43, and the leaf spring 51 may include a pair of flat plate portions 51*a* disposed at both the ends of the shroud segment 43 in the circumferential direction B, and a corrugated plate portion 51*b* disposed between the flat plate portions 51*a* at both the ends in the circumferential direction B. Hereinafter, configurations of the flat plate portions 51*a* and of the corrugated plate portion 51*b* of the leaf spring 51 when the pressing unit 44 is the leaf spring 51 will be described.

The flat plate portion 51*a* has a flat plate shape. The flat plate portion 51*a* extends linearly when viewed in the axial direction A. Of the pair of flat plate portions 51*a*, an end portion on one side of the flat plate portion 51*a* in the circumferential direction B is fixed to an end portion on the one side of the shroud segment 43 in the circumferential direction B, the flat plate portion 51*a* being disposed on the one side in the circumferential direction B. An end portion on the other side of the flat plate portion 51*a* in the circumferential direction B is located on the radial outer side with respect to the end portion on the one side.

Of the pair of flat plate portions 51*a*, an end portion on the other side of the flat plate portion 51*a* in the circumferential direction B is fixed to an end portion on the other side of the shroud segment 43 in the circumferential direction B, the flat plate portion 51*a* being disposed on the other side in the circumferential direction B. An end portion on one side of the flat plate portion 51*a* in the circumferential direction B is located on the radial outer side with respect to the end portion on the other side.

The corrugated plate portion 51*b* has a corrugated plate shape extending in the circumferential direction B. The corrugated plate portion 51*b* extends in a curved shape when viewed in the axial direction A. Specifically, the corrugated plate portion 51*b* is corrugated in the circumferential direction B when viewed in the axial direction A. Both ends of the corrugated plate portion 51*b* in the circumferential direction B are connected to respective end portions of the pair of flat plate portions 51*a*. Therefore, the corrugated plate portion 51*b* is interposed between the flat plate portions 51*a* at both ends in the circumferential direction B.

A thickness of the corrugated plate portion 51*b* is the same as a thickness of the flat plate portions 51*a*. The same thickness referred to here means substantially the same thickness, and slight manufacturing errors or design tolerances are allowed.

Here, connecting portions between the flat plate portions 51*a* and the corrugated plate portion 51*b* are located on both end sides in the circumferential direction B with respect to the central vanes 42 in a region of the shroud segment 43 located on the radial inner side with respect to the vanes 14*a* of the vane group 14.

Therefore, the leaf spring 51 corresponding to each of the central vanes 42 provided on the central side of the shroud segment 43 in the circumferential direction B is the corrugated plate portion 51*b*, and the leaf spring 51 corresponding to the end vanes 41 provided at both the ends in the circumferential direction B is the flat plate portions 51*a*. Even with this configuration, the same actions and effects as those described in the first embodiment can be achieved.

In addition, the stator vane ring 13 of the above embodiments is the stator vane ring 13 used in the gas turbine 1, but may be used in other rotary machines such as a steam turbine.

Additional Notes

The stator vane ring 13 and the rotary machine according to the embodiments are understood, for example, as follows.

(1) A stator vane ring 13 according to a first aspect includes: a vane group 14 including a plurality of vanes 14*a* arranged in a circumferential direction B with respect to an axis O; a shroud segment 43 that connects radial end portions of the plurality of vanes 14*a* of the vane group 14 to connect the plurality of vanes 14*a* in the circumferential direction B, and that has an arc shape extending in the circumferential direction B; and a pressing unit 44 that applies a pressure to the vane group 14 in a radial direction such that the vane group 14 is pressed against the shroud segment 43. The pressing unit 44 has a pressure distribution in which the pressure at a center of the shroud segment 43 in the circumferential direction B is smaller than the pressure at both ends of the shroud segment 43 in the circumferential direction B.

Accordingly, a natural frequency of end vanes 41 can be increased, and a natural frequency generated in central vanes 42 can be reduced. Therefore, since the natural frequencies of the vanes 14*a* are close to each other, a bandwidth of a natural frequency of the stator vane ring 13 as a whole can be narrowed.

(2) In the stator vane ring 13 according to a second aspect, according to the stator vane ring 13 of (1), the pressing unit 44 may include a leaf spring 50 that is provided to extend in the circumferential direction B between the vane group 14 and the shroud segment 43, and that applies the pressure. A plate thickness of the leaf spring 50 at the center of the shroud segment 43 in the circumferential direction B is thinner than a plate thickness of the leaf spring 50 at both the ends of the shroud segment 43 in the circumferential direction B.

Accordingly, an appropriate pressure can be applied to the vane group 14 by a more embodied method, the natural frequency of the central vanes 42 can be reduced, and the natural frequency of the end vanes 41 can be increased.

(3) In the stator vane ring 13 according to a third aspect, according to the stator vane ring 13 of (1), the pressing unit 44 may include a plurality of bolts 60 that press the respective vanes 14*a* of the vane group 14 in the radial direction to apply the pressure. A pressing force of the bolts 60 that press the vanes 14*a* at the center of the shroud segment 43 in the circumferential direction B may be smaller than a pressing force of the bolts 60 that press the vanes 14*a* at both the ends of the shroud segment 43 in the circumferential direction B.

Accordingly, the pressure can be applied to the vane group 14 by a simple and inexpensive configuration such as the bolts 60, the natural frequency of the central vanes 42 can be reduced, and the natural frequency of the end vanes 41 can be increased.

(4) In the stator vane ring 13 according to a fourth aspect, according to the stator vane ring 13 of (1), the pressing unit 44 may include a plurality of bolts 60 that press only the vanes 14*a* at both the ends of the shroud segment 43 in the circumferential direction B to apply the pressure.

Accordingly, the pressure can be applied to the vane group 14 by a simple and inexpensive configuration such as the bolts 60, the natural frequency of the central vanes 42 can be reduced, and the natural frequency of the end vanes 41 can be increased. In addition, since locations where the bolts 60 are provided are limited only to both the ends in the circumferential direction B, processing in manufacturing is facilitated.

(5) In the stator vane ring 13 according to a fifth aspect, according to the stator vane ring 13 of (1), the pressing unit 44 may include a plurality of bolts 60 that press the respective vanes 14*a* of the vane group 14 in the radial direction to apply the pressure. The number of the bolts 60 that press the vanes 14*a* at the center of the shroud segment 43 in the circumferential direction B may be smaller than the number of the bolts 60 that press the vanes 14*a* at both the ends of the shroud segment 43 in the circumferential direction B.

Accordingly, the pressure can be applied to the vane group 14 by a simple and inexpensive configuration such as the bolts 60, the natural frequency of the central vanes 42 can be reduced, and the natural frequency of the end vanes 41 can be increased.

(6) In the stator vane ring 13 according to a sixth aspect, according to the stator vane ring 13 of any one of (3) to (5), the pressing unit 44 may further include a pressing plate 70 extending in the circumferential direction B between the vane group 14 and the pressing unit 44. The bolts 60 may press the vanes 14*a* through the pressing plate 70.

Accordingly, the vane group 14 is surface-pressed by the pressing plate 70, so that the pressure can be more effectively applied to the vane group 14.

(7) In the stator vane ring 13 according to a seventh aspect, according to the stator vane ring 13 of (6), the pressing unit 44 may further include a pressing spring 80 provided between the pressing plate 70 and the bolt 60.

Accordingly, the pressing spring 80 is interposed therebetween, so that the vane group 14 can be more appropriately pressed with an elastic pressure.

(8) In the stator vane ring 13 according to an eighth aspect, according to the stator vane ring 13 of (1), the pressing unit 44 may include a plurality of actuators 90 that press the respective vanes 14*a* of the vane group 14 in the radial direction to apply the pressure, and a pressing plate 70 extending in the circumferential direction B between the vane group 14 and the actuators 90. A pressing force of the actuators 90 that press the vanes 14*a* at the center of the shroud segment 43 in the circumferential direction B through the pressing plate 70 may be smaller than a pressing force of the actuators 90 that press the vanes 14*a* at both the ends of the shroud segment 43 in the circumferential direction B through the pressing plate 70.

Accordingly, an expansion and contraction amount of the actuators 90 can be controlled even during operation of a gas turbine 1, and suitable active control according to situations can be realized.

(9) In the stator vane ring 13 according to a ninth aspect, according to the stator vane ring 13 of (1), the pressing unit 44 may include a leaf spring 51 that is provided to extend in the circumferential direction B between the vane group 14 and the shroud segment 43, and that applies the pressure. The leaf spring 51 may include flat plate portions 51*a* disposed at both the ends of the shroud segment 43 in the circumferential direction B, and a corrugated plate portion 51*b* disposed between the flat plate portions 51*a* at both the ends in the circumferential direction B.

Accordingly, an appropriate pressure can be applied to the vane group 14 by a more embodied method, the natural frequency of the central vanes 42 can be reduced, and the natural frequency of the end vanes 41 can be increased.

(10) A rotary machine according to a tenth aspect includes the stator vane ring 13 according to any one of (1) to (9).

Accordingly, it is possible to provide the rotary machine in which a bandwidth of a natural frequency of the stator vane ring 13 is narrowed.

INDUSTRIAL APPLICABILITY

According to the present disclosure, it is possible to provide the stator vane ring capable of narrowing a bandwidth of a natural frequency, and the rotary machine.

REFERENCE SIGNS LIST

1: Gas turbine
2: Compressor
3: Compressor rotor
4: Compressor casing
5: Compressor rotor blade ring
7: Compressor stator vane ring
9: Combustor
10: Turbine
11: Rotor
11*a*: Rotating shaft
12: Stator
13: Stator vane ring
14: Vane group
14*a*: Vane
14*b*: Flange portion
15: Turbine casing
20: Turbine rotor blade ring
40: Outer peripheral side shroud
41: End vane
42: Central vane
43: Shroud segment
43*a*: Recessed portion
43*b*: Engaging portion
44: Pressing unit
50, 51: Leaf spring
51*a*: Flat plate portion
51*b*: Corrugated plate portion
60: Bolt
70: Pressing plate
70*a*: One surface
70*b*: The other surface
80: Pressing spring
90: Actuator
O: Axis
A: Axial direction
B: Circumferential direction
P: Pressure generation region

The invention claimed is:

1. A stator vane ring comprising:
a vane group including a plurality of vanes arranged in a circumferential direction with respect to an axis;
a shroud segment that connects radial end portions of the plurality of vanes of the vane group to connect the plurality of vanes in the circumferential direction, and that has an arc shape extending in the circumferential direction; and
a pressing unit that applies a pressure to the vane group in a radial direction such that the vane group is pressed against the shroud segment,
wherein the pressing unit has a pressure distribution in which the pressure at a center of the shroud segment in the circumferential direction is smaller than the pressure at both ends of the shroud segment in the circumferential direction.

2. The stator vane ring according to claim 1,
wherein the pressing unit includes a leaf spring that is provided to extend in the circumferential direction between the vane group and the shroud segment, and that applies the pressure, and
a plate thickness of the leaf spring at the center of the shroud segment in the circumferential direction is thinner than a plate thickness of the leaf spring at both the ends of the shroud segment in the circumferential direction.

3. The stator vane ring according to claim 1, wherein the pressing unit includes a plurality of bolts that press the respective vanes of the vane group in the radial direction to apply the pressure, and a pressing force of the bolts that press the vanes at the center of the shroud segment in the circumferential direction is smaller than a pressing force of the bolts that press the vanes at both the ends of the shroud segment in the circumferential direction.

4. The stator vane ring according to claim 3, wherein the pressing unit further includes a pressing plate extending in the circumferential direction between the vane group and the pressing unit, and each bolts press the vanes through the pressing plate.

5. The stator vane ring according to claim 4, wherein the pressing unit further includes a pressing spring provided between the pressing plate and the bolt.

6. The stator vane ring according to claim 1, wherein the pressing unit includes a plurality of bolts that press only the vanes at both the ends of the shroud segment in the circumferential direction to apply the pressure.

7. The stator vane ring according to claim 6, wherein the pressing unit further includes a pressing plate extending in the circumferential direction between the vane group and the pressing unit, and the bolts press the vanes through the pressing plate.

8. The stator vane ring according to claim 1, wherein the pressing unit includes a plurality of bolts that press the respective vanes of the vane group in the radial direction to apply the pressure, and the number of the bolts that press the vanes at the center of the shroud segment in the circumferential direction is smaller than the number of the bolts that press the vanes at both the ends of the shroud segment in the circumferential direction.

9. The stator vane ring according to claim 8, wherein the pressing unit further includes a pressing plate extending in the circumferential direction between the vane group and the pressing unit, and the bolts press the vanes through the pressing plate.

10. The stator vane ring according to claim 1, wherein the pressing unit includes a plurality of actuators that press the respective vanes of the vane group in the radial direction to apply the pressure, and a pressing plate extending in the circumferential direction between the vane group and the actuators, and a pressing force of the actuators that press the vanes at the center of the shroud segment in the circumferential direction through the pressing plate is smaller than a pressing force of the actuators that press the vanes at both the ends of the shroud segment in the circumferential direction through the pressing plate.

11. The stator vane ring according to claim 1, wherein the pressing unit includes a leaf spring that is provided to extend in the circumferential direction between the vane group and the shroud segment, and that applies the pressure, and the leaf spring includes flat plate portions disposed at both the ends of the shroud segment in the circumferential direction, and a corrugated plate portion disposed between the flat plate portions at both the ends in the circumferential direction.

12. A rotary machine comprising:

the stator vane ring according to claim 1.

* * * * *